United States Patent [19]

Nikkanen

[11] Patent Number: 5,575,147
[45] Date of Patent: Nov. 19, 1996

[54] COMPACT THRUST REVERSER

[75] Inventor: John P. Nikkanen, West Hartford, Conn.

[73] Assignee: United Technologies Corporation, Hartford, Conn.

[21] Appl. No.: 361,628

[22] Filed: Dec. 22, 1994

[51] Int. Cl.$^6$ ...................................................... F02K 1/72
[52] U.S. Cl. ........................ 60/226.2; 60/230; 239/265.29
[58] Field of Search .................................. 60/226.2, 230; 239/265.29, 265.31; 244/110 B

[56] References Cited

U.S. PATENT DOCUMENTS 3,500,644  3/1970  Hom et al. .............................. 60/226.2
3,568,930  3/1971  Huchar ....................................... 60/229
4,356,973  11/1982  Lawson .................................... 60/226.2

Primary Examiner—Louis J. Casaregola
Attorney, Agent, or Firm—Marina F. Cunningham

[57] ABSTRACT

A thrust reverser (30) of a gas turbine engine (10) includes a blocker door (36) and a plurality of cascades (38). The thrust reverser (30) and the blocker door (36) have a stowed position and a deployed position. In the deployed position the blocker door (36) "leaks" airflow therethrough without generating substantial forward thrust. The leaked airflow reduces the amount of total airflow that must be accommodated by the cascades (38) of the thrust reverser (30), thereby decreasing the overall size of the cascades (38) and of the associated thrust reverser hardware and subsequently reducing the overall weight thereof.

3 Claims, 2 Drawing Sheets

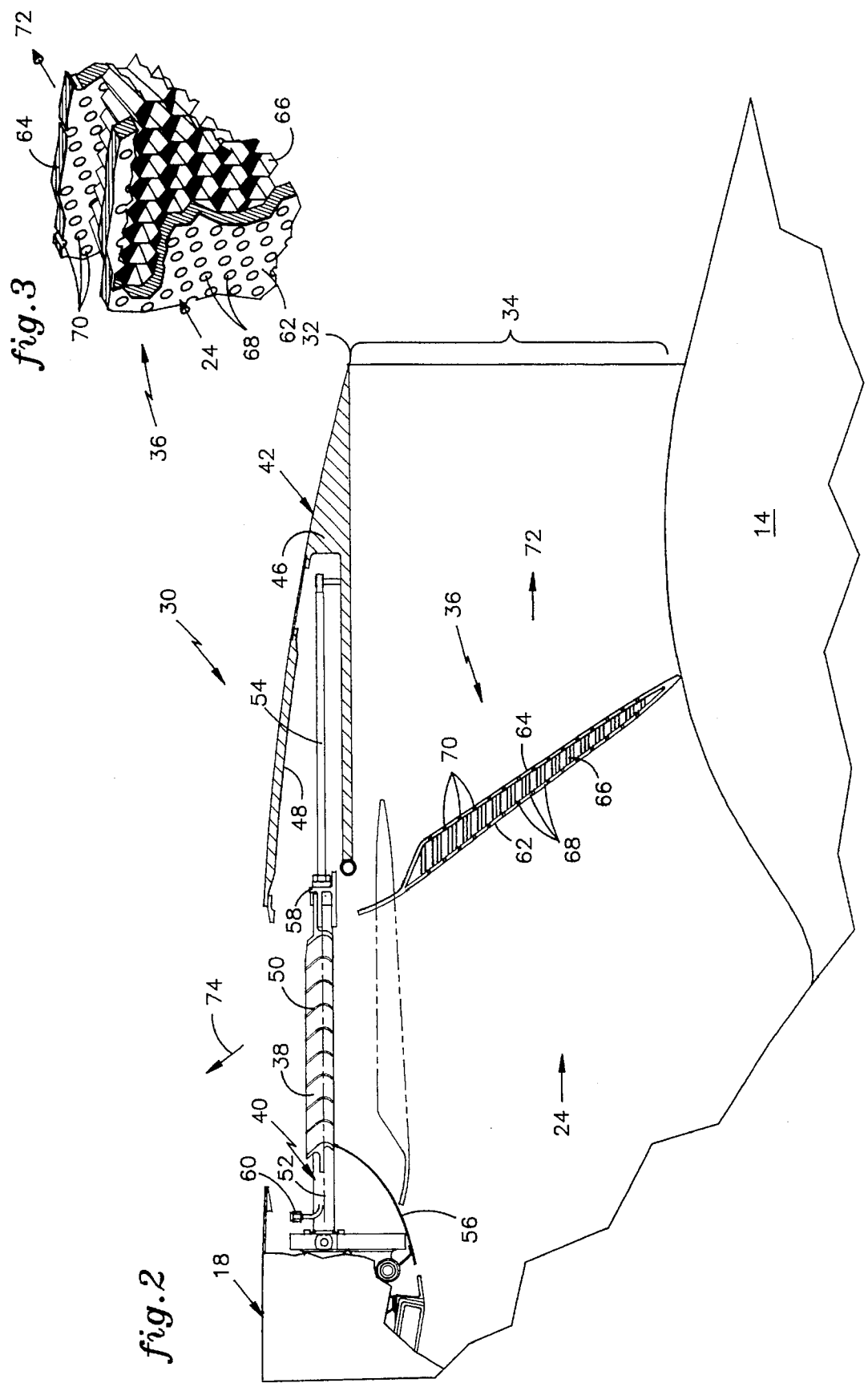

COMPACT THRUST REVERSER

TECHNICAL FIELD

This invention relates to gas turbine engines and, more particularly, to thrust reversers therefor.

BACKGROUND OF THE INVENTION

Conventional gas turbine engines include a fan section and a core engine with the fan section having a larger outer diameter than that of the core engine. The fan section and the core engine are disposed sequentially about a longitudinal axis and are enclosed in a nacelle. An annular path of primary airflow passes through the fan section and the core engine to generate primary thrust. An annular path of duct or fan flow, disposed radially outward of the primary airflow path, passes through the fan section and exits through a fan nozzle to generate fan thrust.

After touch down, a thrust reverser is activated to slow down the aircraft. The thrust reverser slows down the aircraft by preventing the gas turbine engine from generating forward fan thrust and by generating reverse thrust to counteract primary forward thrust. The thrust reverser is disposed in the downstream portion of the nacelle and comprises a translating sleeve and a blocker door, each having a stowed and a deployed position. In the stowed position, the blocker door is disposed in a substantially parallel relationship to the longitudinal axis of the engine. Upon actuation, the blocker door swings into the deployed position to block the fan flow path, thereby preventing the fan flow from generating the forward fan thrust. Upon actuation, the translating sleeve slides axially downstream into the deployed position to expose a plurality of cascades. Each cascade includes a plurality of turning vanes to guide the fan flow. Since the blocker door blocks the path of the fan flow, substantially the entire fan flow is diverted through the cascades. The turning vanes turn the fan flow to generate reverse thrust that counteracts the forward primary thrust.

The newer generations of gas turbine engines tend to have longer fan blades that generate a greater volume of fan flow, consequently resulting in greater fan thrust. The thrust reversers of these newer engines must be proportionally larger in order to accommodate the larger volume of fan flow and the wider fan flow path. Specifically, the blocker door must be fabricated to be longer to span the wider fan flow path. Also, the cascade must be fabricated to be longer in order to accommodate the larger volume of the fan flow that is being diverted. The longer cascade dictates the use of a longer translating sleeve that slides on a longer set of tracks and is activated by a longer set of actuators. The additional length of the hardware translates into a heavier gas turbine engine. As is well known in the art, the extra weight adversely effects the overall performance of the aircraft. The additional weight induces extra drag which results in additional fuel consumption for operation of the engine. Therefore, it is the primary objective in gas turbine engine fabrication to avoid a weight increase therein.

DISCLOSURE OF THE INVENTION

According to the present invention, a thrust reverser of a gas turbine engine includes a blocker door that allows some fan flow to leak therethrough when the blocker door is deployed, without generating forward thrust, while simultaneously reducing the amount of fan flow that must pass through a plurality of cascades. The blocker door includes a plurality of passageways that allow the fan flow to pass therethrough. The passageways are sized to provide uniform flow as the fan flow exits through the blocker door, thereby not contributing substantially to the engine's forward thrust.

Since a portion of the fan flow leaks through the blocker door, the volume of the remaining fan flow that must be diverted through the plurality of cascades is reduced and therefore can be accommodated by a shorter cascade. A shorter cascade results in shorter associated hardware. The decrease in length of the cascades and associated hardware results in a significant weight savings for the gas turbine engine without sacrificing engine performance.

The foregoing and other advantages of the present invention become more apparent in light of the following detailed description of the exemplary embodiments thereof, as illustrated in the accompanying drawings.

BRIEF DESCRIPTION OF THE DRAWINGS

FIG. 2 is an enlarged, simplified representation of the thrust reverser of FIG. 1 in a deployed position; and FIG. 3 is an enlarged, fragmentary, cross-sectional elevation of a blocker door of the thrust reverser of FIG. 2, according to the present invention.

BEST MODE FOR CARRYING OUT THE INVENTION

Figure 1:
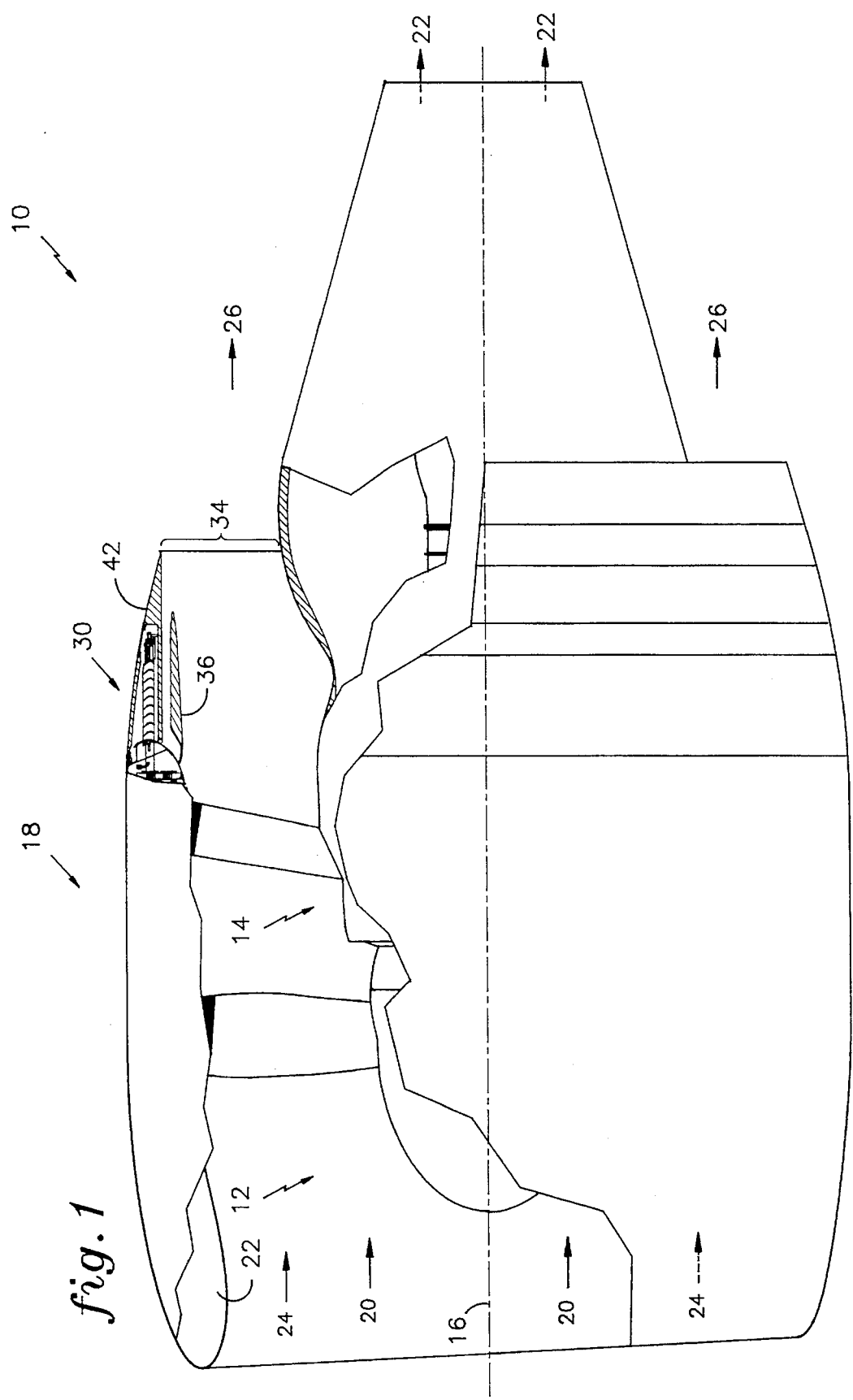
FIG. 1 is a simplified, schematic representation of a gas turbine engine with a thrust reverser shown in a stowed position, according to the present invention.

Referring to FIG. 1, a gas turbine engine 10 includes a fan section 12 and a core engine 14 disposed sequentially about a longitudinal axis 16. The core engine 14 and the fan section 12 are enclosed in a nacelle 18. An annular path of primary airflow 20 passes through the fan section 12 and the core engine 14 generating primary thrust 22. An annular path of fan flow 24, disposed radially outward of the path of the primary airflow 20, bypasses the core engine 14 and flows through the fan section 12 generating fan thrust 26.

A thrust reverser mechanism 30, shown in greater detail in FIG. 2, is disposed in the downstream portion of the nacelle 18 with a trailing edge 32 of the thrust reverser mechanism 30 defining a fan exit nozzle 34. The thrust reverser mechanism 30 comprises a plurality of blocker doors 36, a plurality of cascades 38, a plurality of actuators 40, a plurality of tracks (not shown), and a translating sleeve 42. The translating sleeve 42 includes an aerodynamically shaped body 46 with a recess 48 that accommodates the cascades 38 therein. The translating sleeve 42 has a stowed position and a deployed position. In the stowed position, shown in FIG. 1, the translating sleeve 42 encloses the cascades 38 within the recess 48. In the deployed position, shown in FIG. 2, the translating sleeve 42 moves axially downstream to expose the cascades 38. Each cascade 38 comprises a plurality of turning vanes 50.

Each actuator 40 includes a cylinder 52 and a movable rod 54. Each cylinder 52 is attached to a torque box 56 and a support beam 58. Each rod 54 is secured onto the translating sleeve 42. Hydraulic pressure to the actuators 40 is provided through tubing 60.

The blocker door 36 has a stowed position and a deployed position. In the stowed position, the blocker door 36 is in a substantially parallel relationship to the longitudinal axis 16, as shown in FIG. 1 and in phantom in FIG. 2. The blocker door 36 swings about a pivot point (not shown) into the deployed position upon actuation, as shown in FIG. 2. The blocker door 36 includes a first face sheet 62 and a second face sheet 64 with a honeycomb structure 66 sandwiched therebetween, as best seen in FIG. 3. The first and second face sheets 62, 64 include a first and a second plurality of openings 68, 70 respectively. The first plurality of openings 68, the honeycomb structure 66, and the second plurality of openings 70 form a plurality of passageways within the blocker door 36 for the fan flow 24 to pass therethrough.

During takeoff, climb, cruise, and descent, the translating sleeve 42 and the blocker door 36 are in their stowed positions. Primary thrust 22 is generated by the primary airflow 20 that exits the core engine 14. Fan thrust 26 is generated by the fan flow 24 exiting through the fan exit nozzle 34. During those modes of operation, the blocker door 36 and the thrust reverser 42 do not interfere with the fan flow 24, as shown in FIG. 1.

After touch down, the thrust reverser body 46 is moved axially downstream into the deployed position when the hydraulic pressure builds up in the thrust reverser cylinders 52 and extends the movable rod 54 axially downstream, as shown in FIG. 2. The thrust reverser body 46 moves downstream along a set of tracks (not shown). The thrust reverser body 46 then uncovers the cascades 38. The blocker door 36 swings radially inward into the deployed position to obstruct the flow path of the fan flow 24. A portion of the fan flow 24 leaks through the perforated blocker door 36. The fan flow 24 enters the blocker door 36 through the first plurality of openings 68 and flows through the honeycomb structure 66 to exit the blocker door 36 through the second plurality of openings 70. As the fan flow 24 passes through the perforations of the blocker door 36, exiting flow 72 mixes rapidly to a substantially uniform state and loses total pressure within a short distance downstream of the blocker door 36. The forward thrust generated by this managed leak is substantially reduced due to the loss in total pressure. For example, a blocker door having 30% open area results in an approximately 70% loss of forward thrust of the fan flow that leaked therethrough.

Another portion of the fan flow 24, that does not leak through the blocker door 36, passes through the cascade 38. As the airflow passes through the cascade 38, it is turned by the turning vanes 50 and results in reverse thrust, designated by an arrow 74. Reverse thrust 74 counteracts the forward primary thrust 22, thereby slowing down the aircraft.

The blocker door 36 of the present invention, allowing the fan flow 24 to leak through the deployed blocker door, improves the overall efficiency of the gas turbine engine by allowing a significant weight decrease in the gas turbine engine. The weight decrease is a result of the shorter cascade 38, shorter translating sleeve 42, shorter actuators 40, and shorter tracks (not shown) that can be used on the gas turbine engine incorporating a "leaky" blocker door 36 of the present invention. Since a portion of the fan flow 24 exits through the blocker door 36 without generating forward thrust, a much smaller remaining portion of the fan flow must be accommodated by the cascades 38. The smaller amount of airflow can be accommodated by a shorter cascade. Consequently, the shorter cascade requires the translating sleeve to travel a shorter distance to expose the cascade. Therefore, the actuators and tracks also can be shorter. The decreased length of all of the associated hardware of the thrust reverser 30 represents a significant savings in the overall weight of the gas turbine engine 10.

The weight reduction of the gas turbine engine is obtained without sacrificing the performance of the gas turbine engine. The leaked airflow 74 does not adversely effect gas turbine engine performance and does not hinder the stopping capabilities of the gas turbine engine. First of all, the fan flow is leaked without generating substantial forward fan thrust. Secondly, since the amount of the flow through the cascade is reduced, the amount of reverse thrust generated is also reduced. However, the reduced amount of reverse thrust is still adequate for the newer generation of engines. The newer engines typically generate proportionally a greater amount of fan flow than primary flow, and subsequently a greater amount of fan thrust than primary thrust. Therefore, it is not necessary to use the entire amount of fan flow to generate reverse fan thrust to counteract the forward primary thrust. A portion of the fan flow generating reverse thrust is sufficient to counteract the forward primary thrust.

The size and pattern of the first and second plurality of openings 68, 70 is not crucial, as long as the leaked airflow 72 does not significantly contribute to the engine forward thrust. Very large openings may result in drag loss when the blocker door 36 is in the stowed position. However, very small openings could get blocked by sand and dust particles that may be ingested by the gas turbine engines. The percentage of the open area of the blocker door is specific to each engine design and has to be tailored for each particular application. For example, 0.0625 inch diameter openings with 0.10 inch spacing therebetween would result in an approximately 40% open area within the blocker door 36.

Although the invention has been shown and described with respect to exemplary embodiments thereof, it should be understood by those skilled in the art that various changes, omissions, and additions may be made thereto, without departing from the spirit and scope of the invention. For example, the structure of the blocker door can be different. As long as the blocker door in the deployed position allows fan flow to leak therethrough, the specific structure of the blocker door is not critical.

I claim:

1. A thrust reverser for a gas turbine engine, said thrust reverser having a blocker door, said blocker door having a stowed position and a deployed position, said blocker door in said deployed position obstructing a path of a fan flow, said thrust reverser characterized by:

a plurality of passageways formed within said blocker door for allowing said fan flow to leak therethrough when said blocker door is disposed in said deployed position, said blocker door having a first face sheet and a second face sheet with a honeycomb structure sandwiched therebetween, said first face sheet having a first plurality of openings, said second face sheet having a second plurality of openings, said first plurality of openings, said honeycomb structure and said second plurality of openings forming said plurality of passageways within said blocker door for allowing said fan flow to leak therethrough.

2. A thrust reverser for a gas turbine engine, said thrust reverser having a blocker door and a plurality of cascades, said blocker door having a stowed position and a deployed position, said blocker door in said deployed position obstructing a path of a fan flow, said thrust reverser characterized by:

a plurality of passageways formed within said blocker door for allowing said fan flow to leak therethrough when said blocker door is disposed in said deployed position, whereby size of each said cascade and size of hardware associated with said plurality of cascades is minimized to reduce the weight thereof, said blocker door having a first face sheet and a second face sheet with a honeycomb structure sandwiched therebetween, said first face sheet having a first plurality of openings, said second face sheet having a second plurality of openings, said first plurality of openings, said honeycomb structure and said second plurality of openings forming said plurality of passageways within said blocker door for allowing said fan flow to leak therethrough.

3. The thrust reverser according to claim 2, further characterized by said hardware of said plurality of cascades including a translating sleeve having an aerodynamically shaped translating sleeve body with a recess therein to accommodate said plurality of cascades, said translating sleeve having a stowed position and a deployed position, said translating sleeve being moved axially downstream from said stowed position into said deployed position by a plurality of actuators, said plurality of cascades having a plurality of turning vanes, said translating sleeve exposing said plurality of cascades as said translating sleeve being moved into said deployed position.

* * * * *